(12) United States Patent
Fox

(10) Patent No.: US 8,672,797 B2
(45) Date of Patent: Mar. 18, 2014

(54) POWER TRAIN FOR WIND TURBINE

(75) Inventor: Gerald P. Fox, Massillon, OH (US)

(73) Assignee: The Timken Company, Canton, OH (US)

( * ) Notice: Subject to any disclaimer, the term of this patent is extended or adjusted under 35 U.S.C. 154(b) by 375 days.

(21) Appl. No.: 13/062,875

(22) PCT Filed: Sep. 10, 2009

(86) PCT No.: PCT/US2009/056439
§ 371 (c)(1),
(2), (4) Date: Mar. 8, 2011

(87) PCT Pub. No.: WO2010/030724
PCT Pub. Date: Mar. 18, 2010

(65) Prior Publication Data
US 2011/0165983 A1    Jul. 7, 2011

Related U.S. Application Data

(60) Provisional application No. 61/095,816, filed on Sep. 10, 2008.

(51) Int. Cl.
*F16H 57/08* (2006.01)

(52) U.S. Cl.
USPC .......................... 475/330; 475/346; 475/347

(58) Field of Classification Search
USPC .......................................... 475/337, 346, 347
See application file for complete search history.

(56) References Cited

U.S. PATENT DOCUMENTS

| | | | |
|---|---|---|---|
| 3,303,713 A * | 2/1967 | Hicks | 74/411 |
| 5,240,462 A * | 8/1993 | Mochizuki et al. | 475/342 |
| 7,259,471 B2 * | 8/2007 | Basteck | 290/43 |
| 7,579,706 B2 | 8/2009 | Siegfriedsen | |
| 8,192,323 B2 * | 6/2012 | Fox | 475/347 |
| 8,343,009 B2 * | 1/2013 | Berger et al. | 475/337 |
| 2003/0125158 A1 | 7/2003 | Flamang | |
| 2004/0105753 A1 * | 6/2004 | Christensen | 415/4.1 |
| 2008/0194378 A1 | 8/2008 | Fox | |
| 2010/0292044 A1 * | 11/2010 | Lahtinen et al. | 475/346 |

FOREIGN PATENT DOCUMENTS

| | | |
|---|---|---|
| AT | 403310 B | 1/1998 |
| AT | 413310 B | 1/2006 |
| DE | 3701729 A1 | 8/1988 |
| DE | 10318945 B3 | 4/2003 |

(Continued)

OTHER PUBLICATIONS

International Search Report and Written Opinion of International Application No. PCT/US2009/056439 dated Nov. 23, 2009.

*Primary Examiner* — David D Le
*Assistant Examiner* — Steven B Christ
(74) *Attorney, Agent, or Firm* — Polster, Lieder, Woodruff & Lucchesi, L.C.

(57) ABSTRACT

A geared power train (100) for use in a wind turbine application to maximize a step-up ratio within a radial space that is defined by the planetary gearing system ring gear size. The geared power train (100) is configured as a split-compound planetary gearing system with a closed-carrier flex-pin planetary system in a high-torque stage (Stage 1) for receiving driving torque via an input shaft (IN) from a wind turbine, and an open-carrier flex-pin planetary system in a low-torque stage (Stage 2) coupled to the high-torque stage (Stage 1) for delivering the driving torque to an electrical generator via an output shaft (OUT).

13 Claims, 5 Drawing Sheets

(56) References Cited

FOREIGN PATENT DOCUMENTS

| | | | |
|---|---|---|---|
| EP | 0792415 B1 | 10/1995 | |
| GB | 2457773 A | 9/2009 | |
| WO | WO/2007/016336 | * 2/2007 | ............... F16H 1/28 |
| WO | WO/2008/068260 | * 6/2008 | |
| WO | 2009052826 A3 | 10/2008 | |
| WO | 2009100720 A2 | 2/2009 | |
| WO | 2009103473 A2 | 2/2009 | |
| WO | 2009105848 A2 | 2/2009 | |

* cited by examiner

POWER TRAIN FOR WIND TURBINE

CROSS-REFERENCE TO RELATED APPLICATIONS

The present application is the United States National Stage under 35 U.S.C. §371 of International Application Serial No. PCT/US2009/056439, having an International Filing Date of Sep. 10, 2009 and is related to, and claims priority from, U.S. Provisional Patent Application Ser. No. 61/095,816 filed on Sep. 10, 2008, and which is herein incorporated by reference.

STATEMENT REGARDING FEDERALLY SPONSORED RESEARCH

Not Applicable.

BACKGROUND OF THE INVENTION

The present invention is related generally to power train systems, such as those utilized in wind turbines, and specifically to an improved wind turbine power train system configured with a compound split planetary gearing system incorporating a closed carrier flex pin system in a high torque stage together with an open carrier flex pin system in a low torque stage.

Wind turbine system architectures currently in development are aimed at producing lean (low mass, low cost) and reliable machines. One solution being pursued is a hybrid wind turbine which incorporates a combination of a simplified power train (commonly a single-stage planetary gearing system) and a mid-speed generator. To further reduce the rotating mass of this configuration, a higher ratio in the planetary gearing system may be utilized, allowing a reduced size, faster running, generator to replace the mid-speed generator. In other words, if the wind turbine rotates at a given speed of "a" rpm, and if the planetary gearing system ratio is "b", the associated generator will rotate at a speed of (a×b) rpm. The higher the ratio "b" is, the faster the generator will rotate. As a general rule, a smaller generator that rotates faster will be lighter in mass and lower in cost, thus leading to a leaner system design. Therefore, there is an industry need to increase the step up ratio "b" for the planetary gearing system within as small a space as possible, and with as small a mass as possible.

Planetary gearing systems, such as shown in FIGS. 1A and 1B are normally comprised of a sun gear in the center, orbiting planet gears (usually but not always three in number, as shown in FIG. 1A) in mesh with the sun gear, a rotating planetary carrier (coaxial with the sun gear) which is a structural member that holds the planet gears in a fixed relative position, and a ring gear which is also coaxial with the sun gear that surrounds and meshes with all the orbiting planet gears.

Traditionally, each of the planet gears is axially supported by one or more rows of planetary bearings which are, in turn, supported on a non-rotating, but orbiting, pin that is fixed at each end to a wall of a closed planetary carrier (i.e., a carrier having two walls disposed on opposite sides of the planetary gears). This arrangement theoretically splits the input torque along a number of equal load paths corresponding to the number of planet gears, and in so doing, reduces the magnitude of the gear forces acting at each gear mesh between the sun gear, the planetary gears, and the ring gear to a correspondingly smaller number.

Gears in a planetary gearing system are normally designed as spur gears, helical gears, or as double helical gears. Regardless of which gear design is used, there are two common issues which may arise. The first is that machining tolerances necessarily create variation in clearances among all the gear meshes. This means that as torsion is applied into the gearing system, the gear mesh with the least clearance will begin supporting the load by itself, until this gear mesh deflects sufficiently so that the gear mesh with the next least clearance begins to support a portion of the load. This load shifting phenomenon will progress until the entire load is fully supported by some number of the gear meshes. In other words, some gear meshes will support more load than others. There are means for introducing flexibility into the gear meshes to restore equalization of loads in the gear meshes, one of which is the use of a floating sun gear in a three planet gear system.

The second drawback to a conventional planetary gearing system employing a closed planetary carrier having two opposite walls connected by webbing is that the applied torsion will twist the closed planetary carrier, rotationally advancing one wall of the planetary carrier carrying one end of the planetary pins ahead of the opposite wall of the planetary carrier carrying the opposite ends of the planetary pins. This rotational advancement misaligns the planetary gears with their mating sun gear and ring gear, resulting in increased wear and frictional forces at the gear meshes. In addition, the supporting planetary gear bearings are subjected to the same amount of misalignment.

When utilized in wind turbine applications, planetary gear system configurations often consist of one of several common configurations described below and shown in the associated figures:

A.—a conventional closed carrier three planet epicyclic systems with a step-up ratio equaling approximately 10:1, as exemplified by the prior art FIG. 1A;

B.—a conventional closed carrier four planet epicyclic systems with a step-up ratio equaling approximately 8:1, as exemplified by the prior art FIG. 1B;

C.—a compound planetary gearing systems with a step-up ratio equaling approximately 14:1, as exemplified by the prior art FIG. 1C;

D.—a split-compound planetary gearing systems using open-carrier planetary gear sets with flex-pins in both a low torque stage, and in a high torque stage, as exemplified by the prior art FIG. 1D; and E.—a system which is similar to "D", but which employs closed-carrier planetary gear sets in both the low- and high-torque stages, as exemplified by the prior art FIG. 1E.

Accordingly, it would be advantageous to provide a geared power train for use in power transmission applications, such as a wind turbine application, which is configured to maximize the effective step-up ratio between an input shaft and an output shaft within a limited space, allowing for the use of lighter-mass electrical generators and lowering the overall system costs.

BRIEF SUMMARY OF THE INVENTION

Briefly stated, the present disclosure provides a geared power train for use in a power transmission system to maximize a step-up ratio between a rotating input shaft and a rotating output shaft within a limited radial space that is defined by the planetary gearing system ring gear size. The power train is configured as a split-compound planetary gearing system with a closed-carrier flex-pin planetary gear system in a high-torque stage, and with an open-carrier flex-pin planetary gear system in a low-torque stage.

In one embodiment, the geared power train of the present disclosure is adapted for application in a wind turbine power transmission system, between an input shaft coupled to a rotating turbine, and an output shaft coupled to an electrical generator. The geared power train is further configured to provide a step-up ratio of approximately 30:1.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1A:
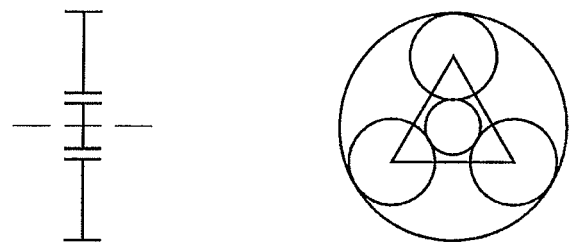
FIG. 1A is a representation of a prior art closed-carrier three-planet epicyclic planetary gear system.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

A power train 100 of the present disclosure is described below primarily in connection with the illustrations shown in FIGS. 2 and 3. The power train 100 is a spit-compound planetary gearing system utilizing a closed-carrier flex-pin system in a high-torque stage (Stage 1), and an open-carrier flex-pin system in a low-torque stage (Stage 2) to achieve a selected step-up ratio between the input shaft (IN) and the output shaft (OUT).

The high-torque stage (Stage 1) incorporates two adjacent arrays 102 of large-diameter planet gears 104 mounted to flex-pins 105 and driven by input torque received through a common ring gear 103 coupled to the input shaft (IN). Each of the planet gears 104 is engaged with a smaller diameter common sun gear 106 coupled to a ring gear 113 of the low-torque stage (Stage 2), and is contained within a closed carrier 108 having two walls, each disposed outward from the arrays 102 of planet gears. The flex-pins 105 of one adjacent array 102 are each supported at one end in a cantilevered inward configuration from a first common wall of the closed carrier 108, and each support a planet gear 104 for rotation about an axis. The flex-pins 105 of the second adjacent array 102 are each supported in a similar fashion from the opposite common wall of the closed carrier 108, and each support a planet gear 104 of the second array for rotation about an axis. The axis of the flex-pins 105 of the first array may or may not align with the axis of the flex-pins 105 of the second array 102 within the volume of the closed carrier 108. During operation, the flex-pins 105 of each array 102 are held about the rotational axis of the sun gear 106 by the grounded closed carrier 108, while the supported planet gears 104 are rotationally driven individually about each flex-pin 105 by input torque from the common ring gear 103. The cantilevered configuration of the flex-pins 105, and their mountings, permits the axial alignment of each of the planet gears 104 to self-adjust to accommodate carrying loads without binding or distorting the walls of the closed carrier 108. Exemplary designs for flex-pins 105 may be found in U.S. Patent Application Publication No. 2008-0194378 A1 to Fox, herein incorporated by reference.

In the low-torque stage (Stage 2), an open-carrier flex-pin system employs either helical or spur-cut planet gears 110 mounted on flex pins 105 supported in cantilever fashion at one end by a single end wall of an open carrier 112 having only one end wall. The planet gears 110 are engaged with a sun gear 109 coupled to the output shaft (OUT) and to a common ring gear 113 directly coupled to, and driven by, the sun gear 106 of the high-torque stage (Stage 1). However, as best seen in FIG. 3, helical gears are be preferred because the rotational speed of the planet gears 110 and sun gear 109 in Stage 2 is faster than those in Stage 1, increasing the potential for generating gear noise. Helical gears may be designed to operate quietly to reduce the overall gear box noise level.

With each carrier 108 and 112, the design of the flex-pins, in conjunction with the carrier walls from which they are cantilevered to support the associated planet gears 104, 110, insures sufficient flexibility to improve load equalization among the planet gears 104, 110 in response to applied loads, and to provide an axial bending pattern that maintains optimum gear mesh alignment between the planet gears 104, 110, sun gears 106, 109, and the ring gear 103 throughout a range of loading.

In contrast to the conventional gear system configurations previously described, the power train of the present disclosure offers several advantages. Conventional closed-carrier planetary systems, as shown in FIG. 1E, contain straddle-mounted planetary idlers (pins) supported at each axial end by the opposite walls of the planet carrier, with the planetary gears disposed at a longitudinal mid-point along the axis of the pins. In contrast, the compliant flex-pin configuration utilized in the power train 100 of the present disclosure facilitates bending of the flex-pins 105 in a circumferential direction to facilitate equalization of loads across the gears. In addition, unlike conventional closed carriers that experience torsional wind up between the opposite walls under load that may misalign the straddle-mounted planetary idlers (pins), the compliant flex pins 105 of the present disclosure will bend at all load levels in a manner that does not induce misalignment along the gear faces. These features increase reliability of the power train system 100 and permit a reduction in gear size and mass.

The power train 100 of the present disclosure further achieves large step-up ratios over conventional power train configurations previously described within the same spatial footprint. For example, when compared with power trains utilizing the single-stage planetary configuration shown in FIG. 1A, the power train 100 of the present disclosure adds the requirement of a second stage, but reduces the risk of gear face misalignment, improving reliability, and achieving a step-up ratio that is 3× higher (30:10) for the same occupied footprint.

Figure 1B:
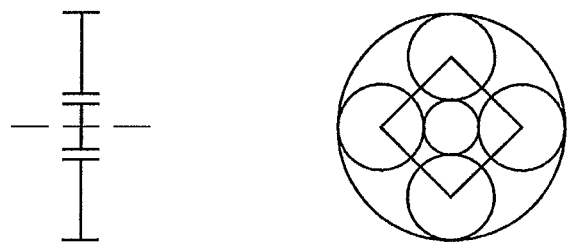
FIG. 1B is a representation of a prior art closed-carrier four-planet epicyclic planetary gear system system.

When the power train 100 of the present disclosure is compared with a power train utilizing the single-stage configuration illustrated in FIG. 1B, the power train 100 of the present disclosure adds the requirement of a second stage, but reduces gear face misalignment, improving load distribution among the planet gears, improves the reliability, and achieves a step-up ratio that is approximately 3.5× higher (30/8) for the same occupied footprint.

Figure 1C:
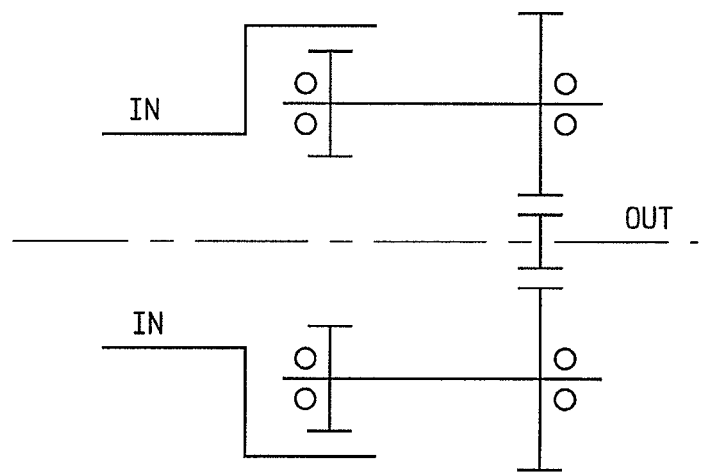
FIG. 1C is a representation of a prior art compound planetary gearing system.

When the power train 100 of the present disclosure is compared with the compound planetary system illustrated in FIG. 1C, the power train 100 of the present disclosure is seen to utilize a greater number of gears, but reduces gear face misalignment and improves load distribution among the planet gears 104, 110, improving the reliability, and achieves a step-up ratio that is approximately 2× higher. (30:14) for the same occupied footprint.

Figure 1D:
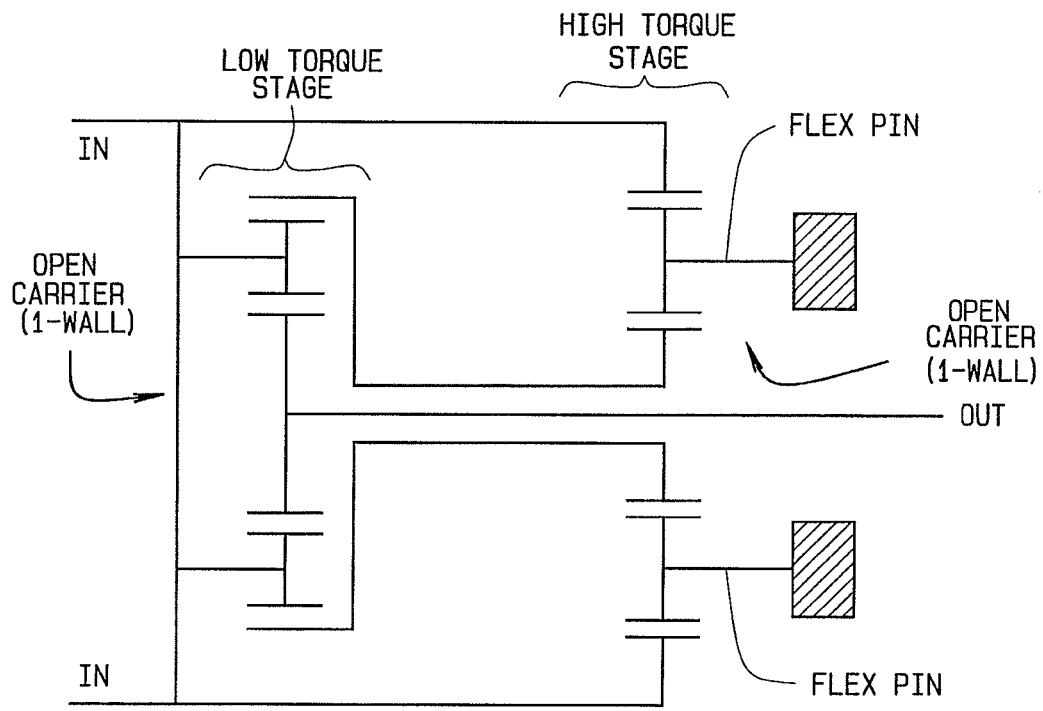
FIG. 1D is a representation of a prior art split-compound planetary gearing system utilizing an open-carrier planetary gear set with flex-pin technology in both a low-torque stage and in a high-torque stage.
Figure 1E:
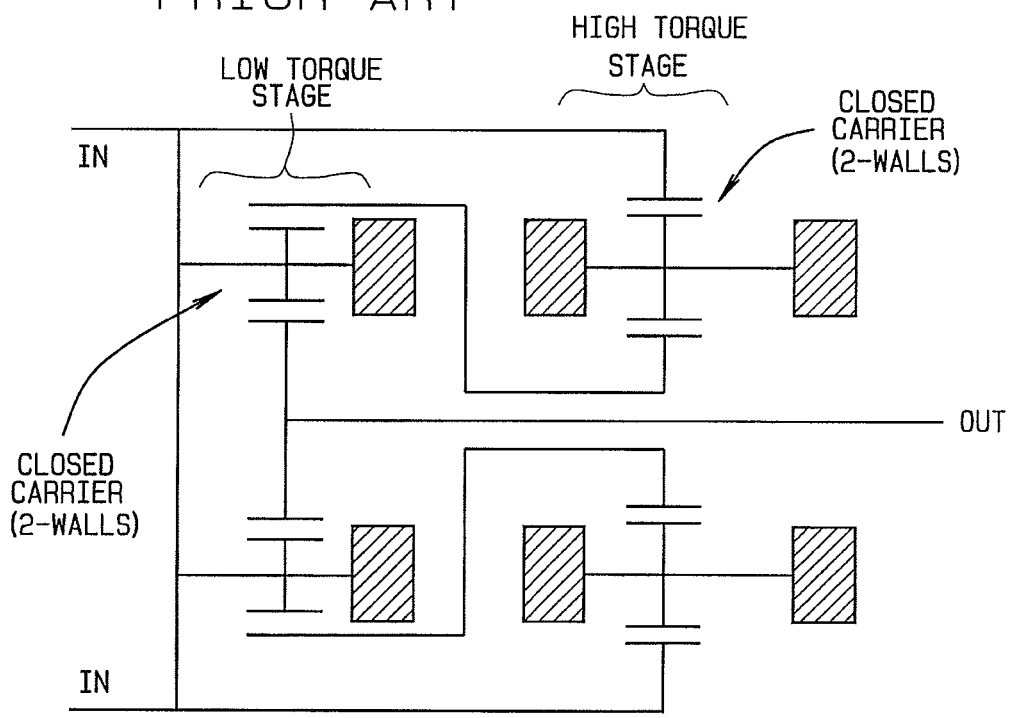
FIG. 1E is a representation of a prior art split-compound planetary gearing system utilizing a closed-carrier planetary gear set in both a low-torque stage and in a high-torque stage.

Similarly, when the power train 100 of the present disclosure is compared with the split-compound planetary system illustrated in FIG. 1D that contains flex-pins in both stages of the array, for a given ring gear size in the high torque Stage 1, the open-carrier containing a large sun gear and a smaller diameter flex-pin planet gear is replaced with the closed-carrier system of Stage 1 containing the two arrays 102 of larger diameter flex-pin planet gears 104 mated with a small diameter sun gear 106 to boost the step-up ratio in the high torque stage by 50%, that is, from approximately 20:1 to 30:1, for an increase of 1.5:1 within the same occupied footprint.

Figure 2:
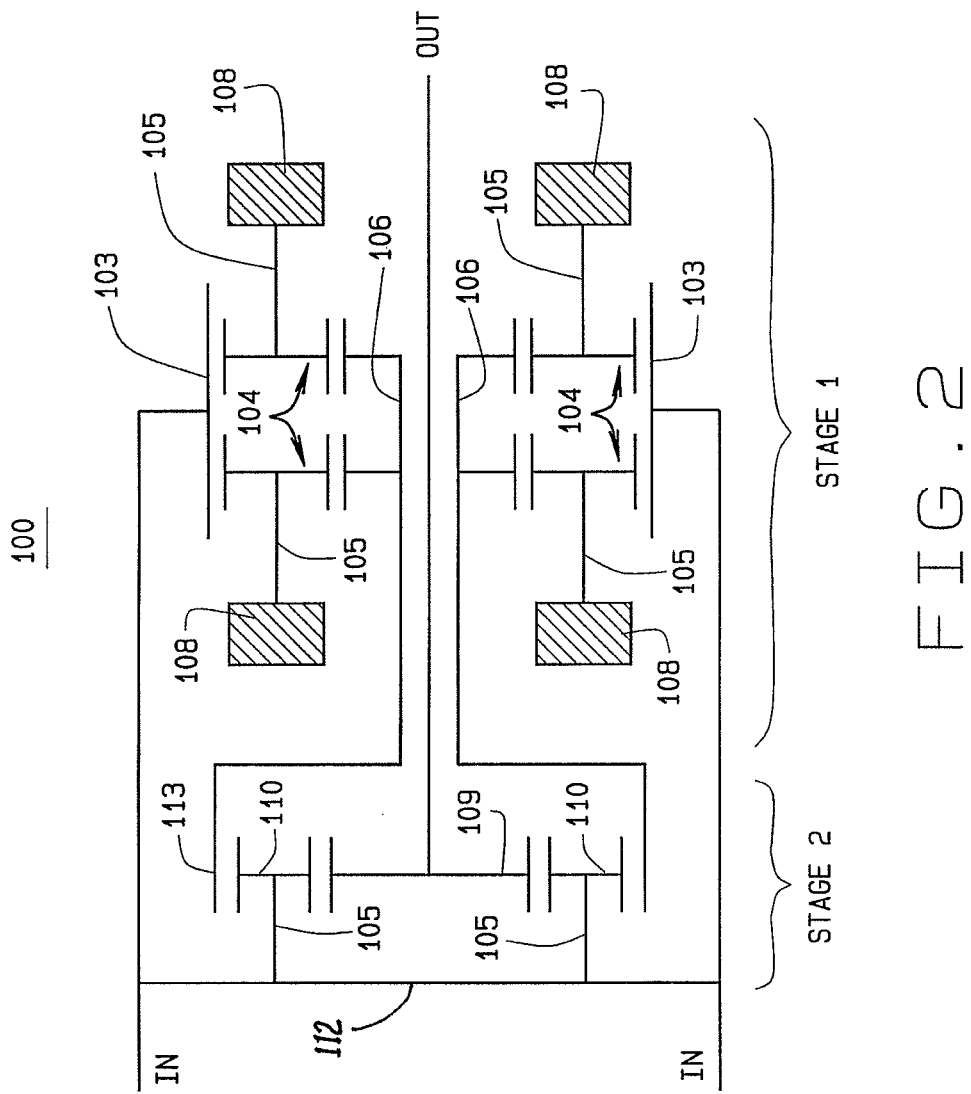
FIG. 2 is a representation of a split-compound planetary gearing system of the present disclosure incorporating a closed-carrier planetary gear set in a high-torque stage, and an open-carrier planetary gear set with flex-pins in a low-torque stage.
Figure 3:
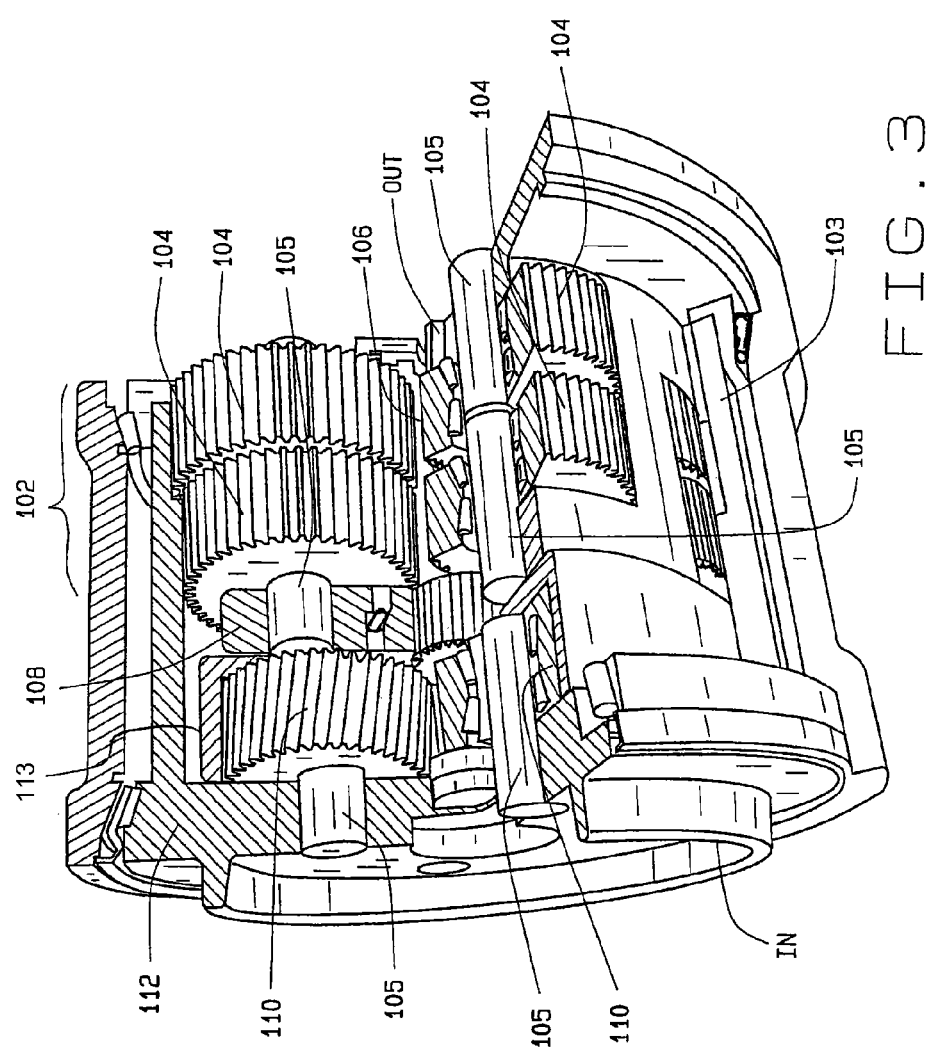
FIG. 3 is a partial cut-away illustration of the split-compound planetary gearing system of FIG. 2.

With the power train 100 of the present disclosure, as illustrated in FIGS. 2 and 3, the step-up ratio of a wind turbine gear box may be increased in a very power dense space by a factor of 1.5 to 3.5 times over conventional power train configurations occupying the same volume, permitting use of a smaller-diameter electrical generator to receive the output from the power train 100. This combination decreases the up-tower mass, and provide potential downsizing opportunities for the wind turbine support structure. Further potential downsizing of the wind turbine power train 100 can be achieved if maximum torque loading is controlled by placing a torque limiting, torque transfer device either in front of, or behind, the power train 100.

Figure 4:
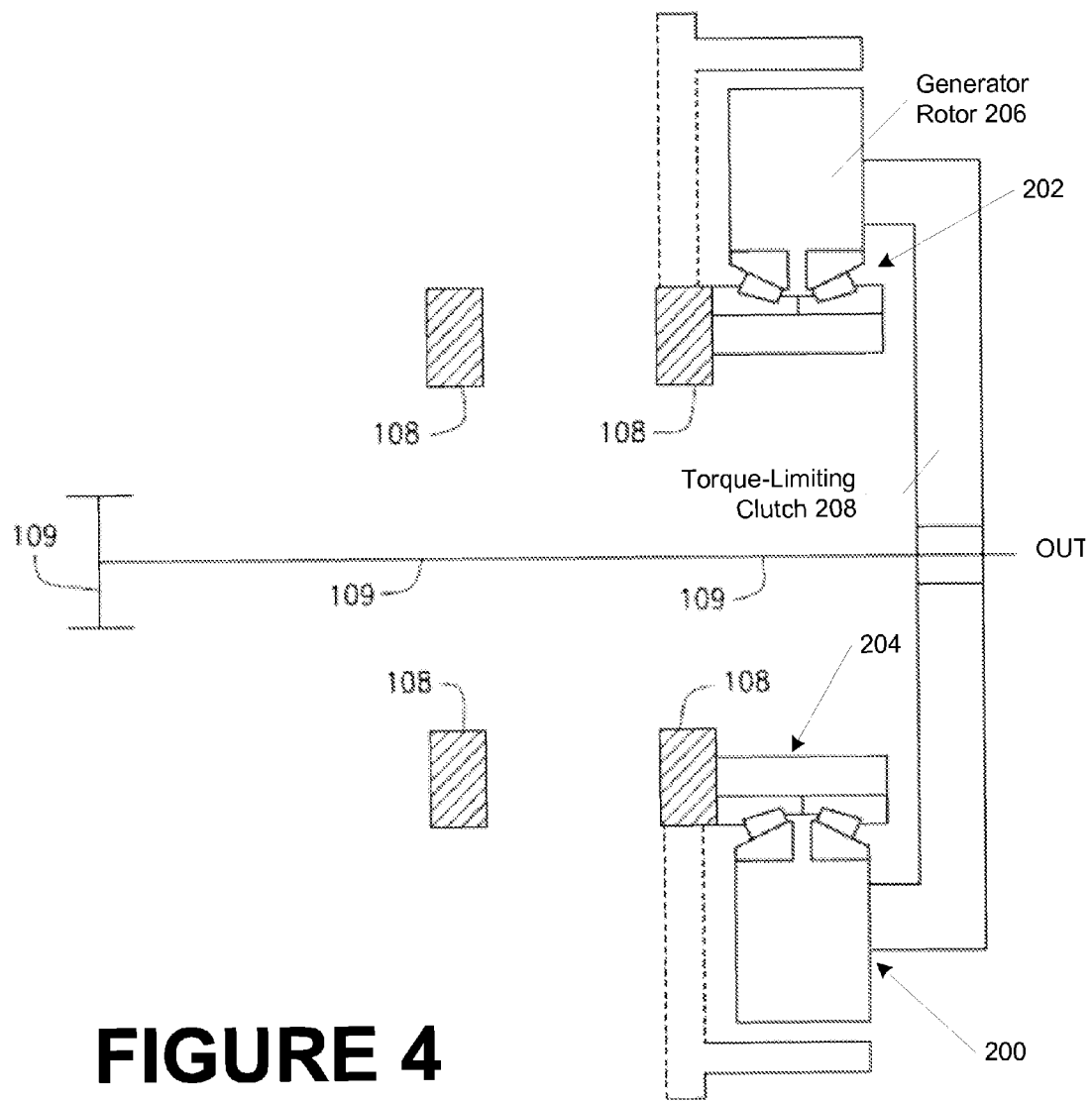
FIG. 4 is a representation of a gearing system of the present disclosure mated to an electrical generator supported on the gearing system carrier wall.

An exemplary configuration of the power train 100, coupled to an smaller-diameter electrical generator 200 is shown in FIG. 4. The electrical generator 200 is mounted to the output shaft OUT and is carried by a bearing assembly 202 supported against an outer diameter of a concentric stub shaft 204 extending outward from the wall of the grounded carrier 108. As shown in FIG. 4, the bearing assembly 202 consists of two rows of tapered rollers mounted in an indirect mounting about the outer diameter of the stub shaft 204, with a rotor 206 of the generator coupled to an outer race of the bearing assembly. It will, however, be recognized that the bearing assembly 202 is not limited to the specific configuration shown in FIG. 4, and that a variety of different configurations may be utilized, including the use of cylindrical or spherical rolling element. Preferably, the rotor component 206 of the electrical generator is coupled to the output shaft OUT via a torque limiting coupling 208 such as a clutch or drive flange.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A planetary gear system, comprising:
an input shaft;
an output shaft;
a split-compound planetary gearing system including a high-torque stage and a low-torque stage, said split-compound planetary gearing system configured to transfer torque from said input shaft to said output shaft through said high-torque stage and said low-torque stage;
said high-torque stage being configured as a closed-carrier flex-pin planetary gear system incorporating two opposing planetary gear arrays disposed within a closed carrier having opposite end walls, each planetary gear array comprising a plurality of planetary gears supported by cantilevered flex-pins extending inward from an associated end wall of said closed carrier, each of said planetary gears engaged with a common ring gear coupled to said input shaft and to a common sun gear coupled to a ring gear of said low-torque stage, the flex-pins, in conjunction with the carrier walls from which they are cantilevered to support an associated planet gear, insuring sufficient flexibility to equalize the load among the planet gears in response to an applied load, so to provide an axial bending pattern that maintains an optimum gear mesh alignment between the planet gears, sun gear, and ring gear throughout a range of loading;
said low-torque stage being configured as an open-carrier flex-pin planetary gear system; and,
the planetary gear system maximizing a step-up ratio between the input shaft and output shaft within a limited radial space defined by the ring gear size of the planetary gear system.

2. The planetary gear system of claim 1 wherein said high-torque stage and said low-torque stage are cooperatively configured to provide a step-up ratio up to 30:1 between said input shaft and said output shaft.

3. The planetary gear system of claim 1 wherein said planetary gear system is further configured for use in a wind turbine application to maximize a step-up ratio within a radial space defined by a diameter of a ring gear associated with said input shaft.

4. The planetary gear system of claim 1 wherein each of said planetary gears in said high-torque stage has an axis of rotation about an associated flex-pin, and wherein said axis of rotation associated with the planetary gears of a first of said adjacent planetary gear arrays within said closed carrier are rotationally offset about an axis of said common sun gear from said axis of rotation associated with the planetary gears of a second of said adjacent planetary gear arrays within said closed carrier, whereby planetary gears of said first adjacent planetary gear array engage different teeth on said common sun gear and said common ring gear from the planetary gears of said second adjacent planetary gear array.

5. The planetary gear system of claim 1 wherein each planetary gear array in said high-torque stage comprises at least two equidistantly-spaced planet gears.

6. The planetary gear system of claim 1 wherein said low-torque stage incorporates a plurality of equidistantly-spaced planet gears each supported by an associated flex-pin cantilevered from a sole end wall of said open carrier, each of said planet gears engaged with a common sun gear coupled to said output shaft and with a common ring gear coupled to said high-torque stage, the flex-pins, in conjunction with the carrier walls from which they are cantilevered to support an associated planet gear, insuring sufficient flexibility to equalize the load among the planet gears in response to an applied load, so to provide an axial bending pattern that maintains an optimum gear mesh alignment between the planet gears, sun gear, and ring gear throughout a range of loading.

7. The planetary gear system of claim 1 wherein said planet gears of said low-torque stage are of a spur gear configuration.

8. The planetary gear system of claim 1 wherein said planet gears of said low-torque stage are of a helical gear configuration.

9. The planetary gear system of claim 1 wherein said input shaft is coupled to a wind turbine to receive driving torque, and wherein said output shaft is coupled to an electrical generator for conveying said driving torque from said wind turbine to said electrical generator.

10. A wind turbine planetary gear system for transferring driving torque from a wind turbine to an electrical generator within a compact spatial volume, comprising:
- an input shaft coupled to a first ring gear, said input shaft receiving driving torque from the wind turbine;
- an output shaft coupled to a sun gear, said output shaft delivering driving torque to the electrical generator;
- a high-torque stage configured with a closed-carrier cantilevered planetary gear arrangement to receive said driving torque from said ring gear of said input shaft and to accommodate torque loads;
- a low-torque stage configured with an open-carrier cantilevered planetary gear arrangement to receive said driving torque from aid high-torque stage and to deliver said driving torque to said sun gear of said output shaft, the arrangement including a single-wall open planet carrier supporting an array of equidistantly-spaced planetary gears mounted on cantilevered flex-pins, each of said planetary gears engaged with a sun gear and a common ring gear rotationally driven by said high-torque stage, the flex-pins, in conjunction with the carrier walls from which they are cantilevered to support an associated planet gear, insuring sufficient flexibility to equalize the load among the planet gears in response to an applied load, so to provide an axial bending pattern that maintains an optimum gear mesh alignment between the planet gears, sun gear, and ring gear throughout a range of loading; and
- wherein said high-torque stage and said low-torque stage are cooperatively configured to maximize a step-up ratio between said input shaft and said output shaft within a limited radial space defined by the ring gear size of the planetary gear system.

11. The wind turbine planetary gear system of claim 10 wherein said closed-carrier planetary gear arrangement includes a two-wall closed planet carrier supporting a pair of opposing arrays of planetary gears between opposite end walls, each of said arrays of planetary gears including a plurality of equidistantly spaced planetary gears engaged with said first ring gear and a common sun gear; and
- wherein each of said planetary gears in said planetary gear arrays is rotationally carried by a flex-pin cantilevered inward at one end from an adjacent wall of said closed planet carrier, the flex-pins, in conjunction with the carrier walls from which they are cantilevered to support an associated planet gear, insuring sufficient flexibility to equalize the load among the planet gears in response to an applied load, so to provide an axial bending pattern that maintains an optimum gear mesh alignment between the planet gears, sun gear, and ring gear throughout a range of loading.

12. The wind turbine planetary gear system of claim 10 wherein said selected step-up ratio is 30:1.

13. The wind turbine planetary gear system of claim 10 wherein said compact spatial volume is defined by an outer circumference of said first ring gear.

* * * * *